United States Patent [19]

McGee

[11] 4,138,091
[45] Feb. 6, 1979

[54] DRIVE NUT AND TORQUE PLATE ASSEMBLY

[75] Inventor: John K. McGee, Houston, Tex.

[73] Assignee: Combustion Engineering, Inc., Windsor, Conn.

[21] Appl. No.: 800,437

[22] Filed: May 25, 1977

[51] Int. Cl.² .............................................. F16K 31/50
[52] U.S. Cl. .................................. 251/267; 251/196; 251/327
[58] Field of Search ............... 251/195, 196, 200, 266, 251/270, 221, 267, 327, 329, 268, 269

[56] References Cited

U.S. PATENT DOCUMENTS

| | | | |
|---|---|---|---|
| 1,360,164 | 11/1920 | Whiteman | 251/195 |
| 1,868,811 | 7/1932 | Yarnall | 251/270 |
| 2,002,647 | 5/1935 | Sorensen | 251/196 |
| 2,150,254 | 3/1939 | Sorensen | 251/196 |
| 2,192,331 | 3/1940 | Schaefer | 251/195 |
| 2,276,620 | 3/1942 | Harrington | 251/196 |
| 2,385,463 | 9/1945 | Penick | 251/196 |

Primary Examiner—Martin P. Schwadron
Assistant Examiner—G. L. Walton
Attorney, Agent, or Firm—Cushman, Darby & Cushman

[57] ABSTRACT

A gate valve gate is raised and lowered by a threaded stem. The stem threads into a separately formed nut that is secured to the gate.

7 Claims, 5 Drawing Figures

DRIVE NUT AND TORQUE PLATE ASSEMBLY

BACKGROUND OF THE INVENTION

Generally, a gate valve gate has an interiorly threaded opening which receives an exteriorly threaded rod. The rod is helically rotated and/or axially moved in order to close and open the gate. Handwheels are used to move the rods manually; pressurized fluid powered, piston-operated actuators are used for moving the rods automatically and/or from a remote location.

Now-conventional gate-to-threaded operator connections are shown in these prior U.S. patents: U.S. Pat. No. 3,349,789, Crain et al., Oct. 31, 1967 U.S. Pat. No. 3,789,875, McGee, Feb. 5, 1974 U.S. Pat. No. 3,990,679, Boitnott, Nov. 9, 1976

Others have previously proposed the use of an intermediate bushing for threadably connecting a gate with a valve stem. Examples are shown in the following prior U.S. patents: U.S. Pat. No. 1,243,736, Hibbard, Oct. 23, 1917 U.S. Pat. No. 2,192,331, Schaefer, Mar. 5, 1940 U.S. Pat. No. 2,276,620, Harrington, Mar. 17, 1942 U.S. Pat. No. 3,662,778, Leopold, Jr. et al., May 16, 1972 U.S. Pat. No. 3,788,600, Allen, Jan. 29, 1974

The Allen patent shows the stem screwed directly into the gate with a splined thrust bearing arrangement in the bonnet. The purpose of the splined arrangement is to allow longitudinal movement for a safety seal operation. The axial force is transmitted directly to the gate via the threads on the stems.

The Harrington patent shows a drive nut connected to a toggle liner which engages a finger member which in turn is bolted to the wedge type gates. The purpose of this arrangement appears to be to apply axial force to one gate member only and to spread the gates laterally.

The Leopold patent shows a drive bushing having lugs on the outer surface to fit mating recesses on the gate member. The axial force is transmitted by these lugs to the gate member.

The Hibbard patent shows a ball socket type of drive bushing but it is connected to a threaded member which raises and lowers the gate member. The parts 15, 16 and 17 fit into an essentially square recess in the gate member and would appear to have the same effect as a square nut and pocket.

The Schaefer patent shows a tee-shaped nut which runs up and down on a threaded stem and a keyway in the valve body to guide the tongues of the nut in its up and down travel. There would be no axial force transmitted to the gate members. However, it would appear that precise fit, alignment, tolerances, friction, wear, buckling, binding of stem, and accumulation of debris in these keyways would make keyways undesirable.

In the prior art, particularly when the stem is threaded directly into the gate as in Allen or having lugs as per Leopold or having an essentially square nut and pocket as per Hibbard, the axial load concentration is highest near the center of rotation when a given amount of torque is applied. The load concentration is reduced when applying the same amount of torque at a point further from the center. The Allen, Leopold and Hibbard patents have this load concentration in the threads, lugs and square nut design. The part of the drive nut designed to prevent rotation of the nut will tend to shear off or become rounded as in the case of lugs or square nuts. This may also cause deformation and stress build-up in the portion of the gate that mates with the lugs or nut.

SUMMARY OF THE INVENTION

A gate valve gate is raised and lowered by a threaded stem. The stem threads into a separately formed nut that is secured to the gate.

The apparatus of the invention, in its presently preferred embodiment serves these objectives:

(A) To allow better thread alignment.

(B) To reduce the load carried by the drive nut and threads by means of the torque plate which is pinned to the outer extremity of each gate half. This spreads resulting torque transmitted to the gates over a wider distance, thus reducing the load concentration at any one point.

(C) To reduce the effect of shear stresses on parts which prevent rotation of the drive nut by eliminating sharp corners and square pockets which tend to become rounded or may cause gate deformation.

(D) To pinch the gates together when opening the valve to prevent mechanical forces from causing increased drag between the seat and the gate.

(E) To obtain a drive nut the manufacture of which does not require close tolerances and which fits by means of a rounded flange and rounded pocket which may be cast into the parts and is secured by a simple pin type arrangement.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION OF THE PRESENTLY PREFERRED EMBODIMENTS

Figure 1:
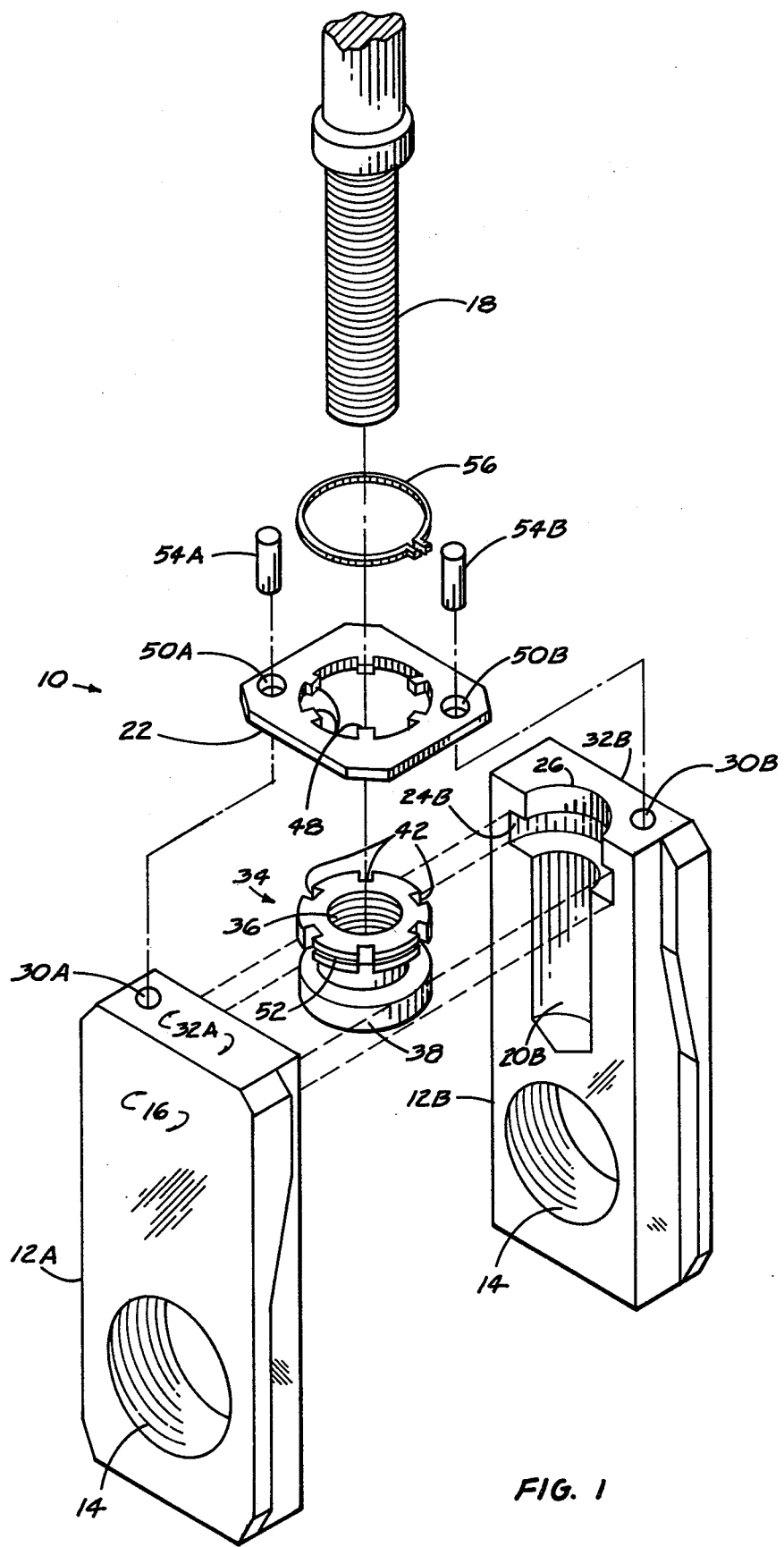
FIG. 1 is an exploded perspective view of a gate valve gate and stem with a drive nut and torque plate assembly constructed according to principles of the present invention.

Gate valves with which the structure of the present invention may be used are so well known that there is no need to illustrate all of the conventional parts. For reference, one may wish to refer to the Crain et al., McGee and Boitnott patents mentioned in the Background section above.

Suffice it to say here, that the gate valve gate 10 includes a pair of gate plates 12a, 12b which face one another, in coordinated position, one upstream and the other downstream in a cavity of the valve housing (not shown) which intersects the longitudinal flow passage of the housing. The cavity, and associated non-conventional valve parts restrict reciprocal movement of the gate between a first, open position wherein the gate plate openings 14 are axially aligned with the housing longitudinal passage, and a second, closed position wherein the gate plate blank regions 16 lie athwart the housing longitudinal passage.

The gate 10 is reciprocated, e.g. raised and lowered, between its open and closed positions, by being threadably connected to a conventional, exteriorly helically threaded valve stem 18.

To accomodate the interconnection between the gate 10 and the stem 18, a generally cylindrical socket 20 is formed in the gate 10. Of course, because the gate is split into halves as plates 12a, 12b, in the instance shown, the socket 20 is likewise provided in two, coordinate, generally semi-cylindrical halves, 20a, 20b.

In the prior art, it would be conventional to cast the gate plates and to provide, as cast, a thickened portion of the socket 20 lining near its mouth. This portion of the casting would then be machined so as to provide a band of internal threading for threaded connection with the stem 18.

As is apparent, no such annular boss is cast and equally apparent, no machined internal threading is provided directly on the gate for connection with the valve stem 18.

The interconnection means 22 shown in FIGS. 1-4 will now be described.

A coaxial, annular, radially inwardly opening recess or groove 24 is formed in the gate 10 (as respective semi-circular halves 24a, 24b in the gate plates 14a), a short distance axially in from the mouth 26. This provides a lip 28.

Figure 2:
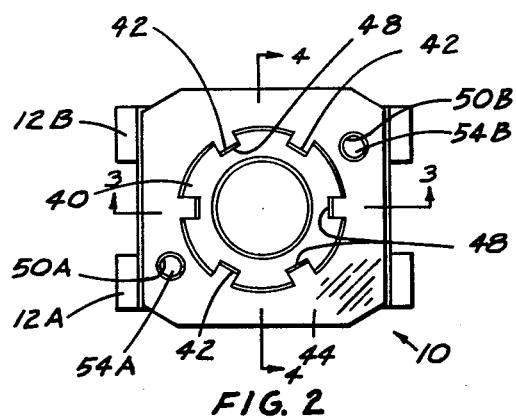
FIG. 2 is a top plan view of the structure of FIG. 1, assembled.

The gate plates 12a, 12b are each further modified by having a small upwardly opening socket 30a, 30b formed in the upper end 32a, 32b thereof. In the preferred embodiment, as seen in FIG. 2, the sockets 30a, 30b are set at the ends of a diagonal of an imaginary square and each is centered upstream, or downstream beyond the midpoint of the thickness of the respective gate plate 12a, 12b.

A separate drive nut 34 is provided. It is internally threaded at 36 to be threadably received on the stem 18. The drive nut 34 has two further features of note: a first external, annular, circumferentially extending, radiating flange 38 positioned intermediate the axial extent of the drive nut, and a second external, annular, circumferentially extending, radiating flange 40 positioned at the upper axial extent of the drive nut 34. The upper end flange 40 is externally splined at 42 parallel to the longitudinal axis thereof.

When the gate plates 12a, 12b are assembled in confronting relation, the drive nut 34 is received in the upper end portion of the socket 20, with the flange 28 thereof interdigitated with the groove 24. The flange 40 overlies the gate plate ends 32a, 32b.

The connecting structure 22 of FIGS. 1-4 further includes a torque plate 44. The torque plate 44 is shown having the form of a generally square plate with an opening 46 centrally provided through the thickness thereof. The periphery of the opening 46 is internally splined at 48, parallel to the longitudinal axis of the opening. Two small openings 50a, 50b are provided axially through the thickness of the plate at sites corresponding to the positions of the sockets 30a, 30b.

An effectively circumferentially extending, radially outwardly opening groove 52 is formed in the external splines 42, midway up the thickness of the flange 40.

To assemble the connecting structure 22, the torque plate 44 splines 48 are slid down into interdigitating relation with the drive nut splines 42, and respective pins 54a, 54b are fitted loosely through the openings 50a, 50b, and secured in the sockets 30a, 30b. The pins 54a 54b continue to protrude up into the openings 50a, 50b. A split retainer ring 56 is snapped into the groove 52 and bears against the axially outer face of the plate 44.

The stem 18 is threaded into the drive nut 34. Accordingly, when the stem 18 is rotated, the gate 10 will be raised or lowered, depending upon the angular sense of rotation of the stem.

Figure 5:
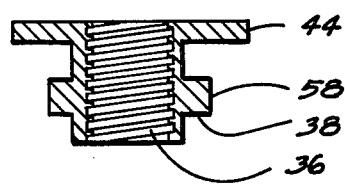
FIG. 5 is a vertical longitudinal sectional view of a modification, wherein the drive nut is integral with the torque plate.
Figure 3:
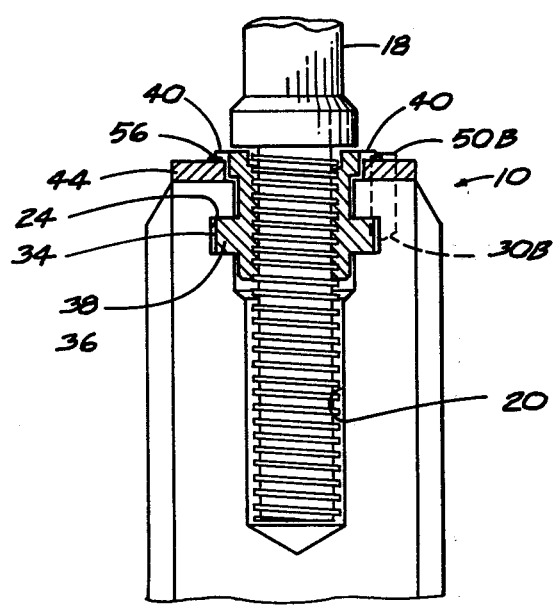
FIG. 3 is a vertical transverse sectional view thereof on line 3—3 of FIG. 2.
Figure 4:
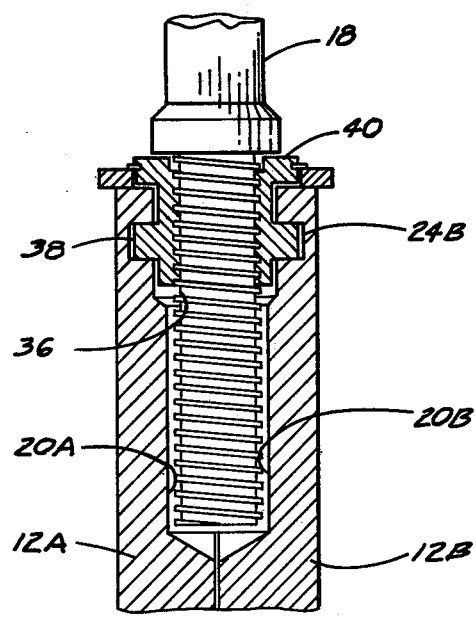
FIG. 4 is a vertical longitudinal sectional view thereof on line 4—4 of FIG. 2.

In the alternate construction shown in FIG. 5, the nut and torque plate are made as an integral unit 58, thus eliminating the spline at 42, 48. However, the unit 58 remains a separate structure that is assembled to the gate 10 as described above for the embodiment of FIGS. 1-4.

The groove 24 and flange 38 could be reversed part for part, yet provide the same functions.

Although some characteristics of the gate, the valve and of the connecting means are described relative to the orientation of the parts shown in the drawings, it should be apparent that the valve can be used in many other spatial attitudes, so relative descriptive terms such as "up" should not be taken in a limiting sense.

In any event, it should be noted that the drive nut and torque plate assembly of FIGS. 1-5 provides means for achieving the objectives (A) through (E) set forth in the "Summary", section above.

It should now be apparent that the drive nut and torque plate assembly as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:
1. Apparatus, including:
(a) a stem having external threading thereon;
(b) body means having means defining a socket therein, which opens outwardly of the body means;
the stem being axially received in the socket from outwardly of the body means;
(c) connecting means threadably connecting the stem with the body means to provide extension and retraction of the stem relative to the body means upon relative rotation of the stem and body means, said connecting means comprising:
nut means having a throughbore lined with internal threading which is complementary to the external threading on said stem,
said nut means being threadably received on said stem,
means defining a coaxially annular, rounded, radial projection on one of the exterior of the nut means and the body means intermediate the axial extend of the throughbore thereof, and
means defining a coaxially annular, rounded, radially opening, groove on the other of the exterior of the nut means and the body means intermediate the axial extent of the throughbore thereof,
the rounded projection being interdigitated with the rounded groove;
and securement means pinning the nut means to the body means distally of said socket;
the nut means including means providing flange means mounted thereon adjacent the axially outer end thereof relative to the said socket, and
said securement means including a plurality of pins projecting axially through said flange means and being secured in said body means distally of said socket.

2. The apparatus of claim 1, wherein:
the body means is constituted by a gate valve gate.

3. The apparatus of claim 2, wherein:
said gate is provided by two confronting plates, having two respective confronting surfaces, a respective generally semi-cylindrical half of said socket being formed in the respective confronting surface of each of said gate plates.

4. The apparatus of claim 3, wherein:
said flange means provided mounted on the nut means comprises a radially outer annular portion formed separately of the remainder of said nut means, a radially inner annular portion formed integrally with said remainder, and a set of interdigitating splines connecting the radially inner and radially outer portions of said flange means.

5. The apparatus of claim 4, wherein:
the connecting means further includes grooves in said splines on said radially inner portion, extending circumferentially of said radially inner portion, and a snap ring received in said grooves and bearing against an axially outer face of said radially outer portion of said flange means.

6. The apparatus of claim 3, wherein:
said coaxially annular, rounded, radially opening groove is formed in said socket and opens radially inwardly.

7. The apparatus of claim 6, wherein:
said gate plates are metal castings.

* * * * *